TRANSDUCTION SYSTEM INCLUDING CURRENT REGULATION

Filed Nov. 23, 1964

INVENTOR
CHUNG C. LIU

United States Patent Office 3,322,971
Patented May 30, 1967

3,322,971
TRANSDUCTION SYSTEM INCLUDING CURRENT REGULATION

Chung Chuan Liu, Rochester, Minn., assignor to Taylor Instrument Companies, Rochester, N.Y., a corporation of New York Filed Nov. 23, 1964, Ser. No. 413,110
10 Claims. (Cl. 307—88.5)

This invention relates to transduction systems and improvements therefor, particularly in respect of systems of the solid state type.

One object of the invention is to provide such systems with improved temperature stability.

Another object of the invention is to provide such systems in self-powered form wherein a system of this sort transduces information signals to direct current signals and the source of the direct current signals is utilized to energize various components of the system.

Other objects of the invention will be apparent from the description and claims appended hereto.

In the type of system under consideration, information in the form of motion, position change, force, and so on, expressive of the value of a variable condition, is converted to corresponding electrical signals, and ultimately to the flow of direct current in a single closed loop, the arrangement being that the amplitude of said direct current reflects said information and is produced by a current source in said loop. Consequently, a suitable load impedance can be included in said loop, for utilizing the information borne by said direct current, yet can also be located at great distance from the remainder of said system. Further, by providing the system in solid state form, all the actual D.C. power involved in electrically activating transistors and the like may be obtained from a relatively low voltage battery in said loop. As a result, the system according to the invention has the advantages of compactness, reliability, safety, and a minimum number of electrical transmission lines attached thereto.

FIGURE 1 illustrates a transduction system according to the invention, whereas

Figure 1:
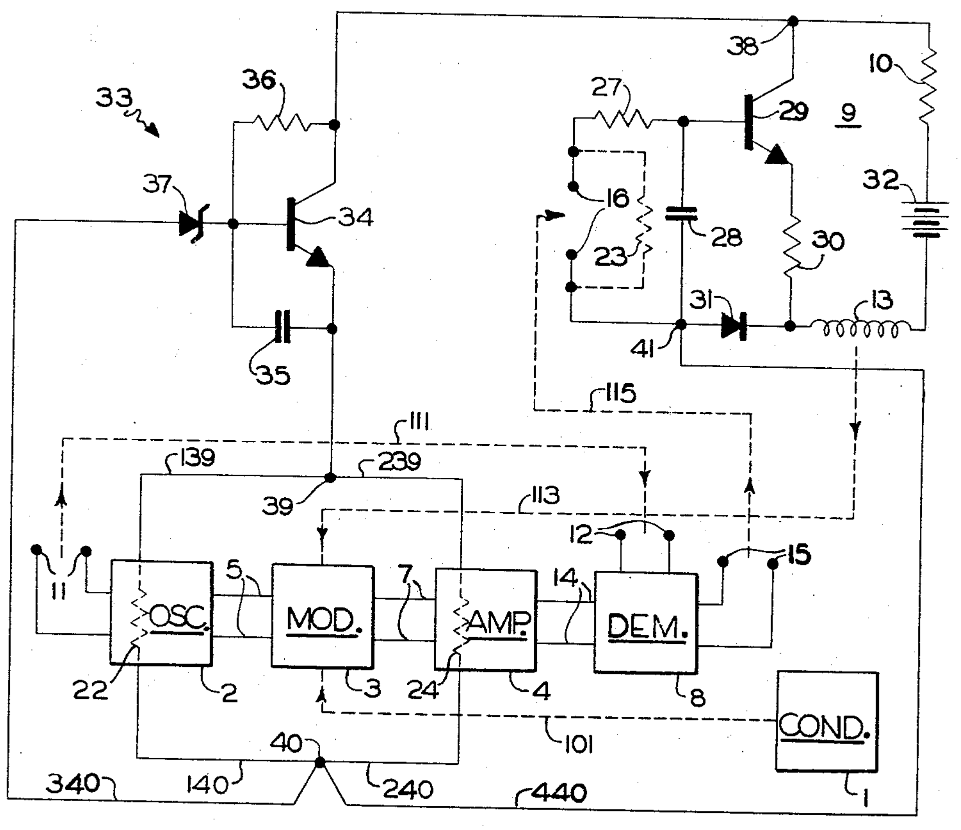

In FIGURE 1, those system parts the detailed structure of which is not germane to the purposes of the invention, are shown in the form of labeled boxes, and various of the means interrelating such parts to the remainder of the system are shown in dashed line, as such means may take various forms without affecting the principles involved in the invention. Each solid interconnecting line, however, signifies a single conducting path (generally speaking, D.C.-conductive), and those parts of the system the detail of which relates particularly to the invention and/or to the understanding thereof, are illustrated by the usual symbols for transistors, resistors and other circuit elements.

The transduction system of FIGURE 1 comprises various means such as a condition responsive device 1, an oscillator 2, a modulator 3, an amplifier 4, and a demodulator 8 all of which, generally speaking, are interrelated in conventional fashion and present no novelties of construction, insofar as the present invention is concerned.

Thus, oscillator 2 provides an electrical carrier wave of fixed frequency and amplitude, the carrier wave being conducted via electrical connections 5 to modulator 3. Modulator 3 modulates said carrier wave and transmits a modulated signal over electrical connections 7 to A.C. amplifier 4. Amplifier 4 produces a corresponding amplified A.C. signal from the modulated A.C. signal and presents the amplified signal to demodulator 8, which accordingly demodulates the amplified signal.

Condition responsive device 1 acts as the modulating agent the effect of which is transmitted by dashed-line coupling 101 to modulator 3. For example, coupling 101 may be a mechanical linkage, the position of which changes due to the effect of a change in a variable condition, such as temperature, pressure, or the like, to which device 1 responds. Accordingly, modulator 3 would be so constructed and arranged as to vary the amplitude of the carrier wave from oscillator 2 as a function of the effect of condition change on coupling 101.

Oscillator 2 also has a pair of output terminals 11 at which the unmodulated carrier wave appears, these terminals being coupled to terminals 12 of demodulator 8 via coupling 111, which last may be simply a pair of D.C. conductors. Demodulator 8 converts the A.C. signal it receives via connections 14 to a D.C. signal having an amplitude proportional to that of the A.C. signal, and gives the D.C. signal a sign depending on the phase relationship between the A.C. signal in connections 14 and the reference signal on terminals 12. The said D.C. signal, of course, appears across terminals 15.

The end use of the voltage across terminals 15 is to produce a D.C. current through a resistor 10 of a load circuit 9, the amplitude of such current being a quantitative representation of said voltage, and therefore of the condition responded to by device 1.

Load circuit 9 consists essentially of resistor 10, a battery 32, an inductance or winding 13 and an emitter resistor 30, in series, as shown, between the collector and the emitter of a transistor 29. As will be observed from the polarities indicated by the graphic symbols used to depict the battery, and the emitter of said transistor, the current in said load circuit will be proportional to the voltage across the base-emitter junction of said transistor, when the base thereof is positive with respect to said emitter, the proportionality between base-emitter voltage and load circuit current being dependent on the magnitude of resistor 30.

The base-emitter voltage is applied at terminals 16 via a coupling 115 which may be simply a pair of D.C. conductors interconnecting the two sets of terminals so as to present the voltage across terminals 15 to the base-emitter junction of transistor 29, the normally negative side of said voltage being connected to the transistor base via a resistor 27, and the other side of said voltage being presented to the junction of resistor 30 and inductor 13 via diode 31. Resistor 27 and capacitor 28 form a filter to remove A.C. from the output of the demodulator. Diode 31 provides a temperature compensation for the transistor, prevents damage thereto if the battery 32 is connected in the load circuit with the wrong polarity, and sets the base to emitter bias.

As will be seen later, load circuit current returns to the negative side of battery 32 via diode 31 and winding 13. As the internal resistance 23 (shown in dashed line) of demodulator 8 is connected, in effect, between terminals 16, the voltage of the base of transistor 29 has a component due to the dynamic resistance of diode 31, which is forward-biased by said load current, in series with the resistance of winding 13.

For temperature compensation purposes, diode 31 is chosen to be of the same material-type as transistor 29 and typically, both would be silicon types. With this arrangement, the forward-resistance of the equivalent diode represented by the transistor's base-emitter junction varies with temperature the same way as does the forward-resistance of diode 31. Therefore, by arranging transistor 29 and diode 31 so that both have substantially the same temperature, the above said component of base voltage varies with temperature in such fashion as to keep the emitter circuit substantially constant, despite variation in the forward drop of the base-emitter junction.

The purpose of coil 13 is to provide the benefit of negative feedback as a function of the amplitude of the current therethrough, hence, dashed-line coupling represents suitable means for exerting the effect of said current on said modulator, but in opposition to the effect on said modulator due to the coupling 101. For example, coupling 113 could be a magnetomotive device producing a motion or force proportional to the ampere-turns of winding 13 and opposing such force or motion to force or motion due to coupling 101, or again the magnetic flux due to the winding 13 might be applied to modulator 7 to produce a modulating effect, non-mechanical in nature, but opposed to the modulating effect of coupling 101.

Preferably, oscillator 2 and amplifier 4 are transistor devices, and hence would have power requirements like those of transistor 24. In such case, this would mean that oscillator 2 and amplifier 4 would each incorporate an equivalent resistance, which I have denoted by the reference numerals 22 and 24 respectively, across which the voltage of the power supply would appear, and via which the respective currents consumed by the oscillator and amplifier would flow. According to the invention, load circuit 9 is used as the power supply for oscillator 2 and amplifier, and regulating means is provided preventing interaction between the load circuit 9 and the power supply circuits of oscillator 2 and amplifier 4.

Said regulating means is denoted by reference numeral 33 and consists essentially of a transistor 34, a capacitor 35, a resistor 36 and a zener diode 37. The current through the regulator is drawn from terminal 38 interconnecting resistor 10 and the transistor collector in the load circuit 9. Resistor 36 is connected across the base-collector junction of transistor 34 and the capacitor 35 is connected across the base-emitter junction of transistor 34.

The emitter of transistor 34 is connected to terminal 39, from which a conductor 139 leads to the equivalent resistance 22 of oscillator 2, and from which a conductor 239 leads to the equivalent resistance 24 of amplifier 4. A terminal 40 provides circuit common for the system, there being conductors 140, 240, 340 and 440 connecting terminal 40 to the equivalent resistance 22, to the equivalent resistance 24, to the anode of diode 37 and to a terminal 41, respectively. As terminal 41 is the junction of the anode of diode 31 and one side of capacitor 28, the current drawn from terminal 38 returns to the battery via diode 31 and winding 13.

The current utilized in electrically activating oscillator 2 and amplifier 4 flows from the emitter of transistor 34 to terminal 39, and thence to terminal 40, in part via conductor 139, resistance 22, and conductor 140, and the rest via conductor 239, resistance 24, and conductor 340, all returning from terminal 40 to the load circuit 9 via conductor 440 and diode 31.

As will be seen, the cathode of zener diode 37 is connected to the base of transistor 34, the reason being to provide a constant source of bias voltage for the base of transistor 34 and thereby fix the value of the emitter-collector current, and resistor 36 having the function of providing that small amount of current that will cause the diode to conduct, zener-wise, when the voltage drop across said diode is higher than the break-down voltage of the diode. The diode and resistor are chosen so that at the lowest expected voltage at terminal 38, the voltage drop across the resistor that would be due to the required zener current will not be so large that insufficient of the voltage at terminal 38 would be left to actually fire the diode, i.e., the drop across the diode must always be enough to cause it to break down, and so that said diode will have a breakdown voltage of a value suitable for the bias needs of the base of transistor 34. It will be observed that diode 37 could be replaced by a battery, and resistor 36 removed. (Capacitor 35 is provided to bypass stray A.C. around the transistor 34.)

In the described connection, transistor 34 has the property that its collector-emitter current is determined by its base voltage and the resistance in the emitter circuit, that is, the voltage at the cathode of diode 37, and the effective D.C. resistance between terminals 39 and 40 (neglecting the contribution due to the dynamic resistance of diode 31, which is small and approximately fixed, and the small contribution of winding 13). On the other hand, this emitter-collector current is substantially independent of the voltage on the collector of transistor 34. As the said effective resistance and the base voltage of the transistor 34 both remain fixed, the emitter to collector current of transistor 34 remains fixed, despite the fact that the voltage at terminal 38 varies inversely with the current through resistor 10.

In effect, transistors 29 and 34 are current regulators connected in parallel with each other across battery 32 and load resistance 10 in series, each such regulator having the property of defining a current path the effective resistance of which is a function of a control signal applied thereto, in this case, the voltage-bias on the transistor base. Such control signal is provided by the other means making up the transduction system, to wit, oscillator 2, et al., in the case of transistor 29, whereas in the case of transistor 34, such control signal is the substantially fixed voltage drop across reverse-biased zener diode 37, said voltage drop being created by the larger drop across the paralleled regulators. Though diode 37 is in a current path parallel to those including the transistors, a negligibly small part of the current traverses such path, due to the presence of resistance 36.

It is to be observed that the total resistance in series between emitter and collector of each transistor, namely, D.C. resistance of winding 13, internal resistance of battery 32, resistance of load resistor 10, in the case of transistor 29, and the effective resistances 22 and 24, in the case of transistor 34, is chosen so that such total resistance is small compared with the apparent emitter to collector resistance of the transistor, so that the transistors act as current sources.

The use of the described system is to transform the value of the condition responded to by condition responsive device 1 to a direct current through resistor 10 that is proportional to said value. Accordingly, resistance 10 represents the input resistance of an ammeter, a current recorder, or other instrument performing some measuring, controlling or like function. Due to the current source property of transistor 29, as described above, load resistance 10 and/or battery 32 can be located at great distances from the remainder of the system, since the length of the necessary connecting wires can be quite long before they add too much resistance to the load circuit. This means, for example, that the instrument represented by load 10 can be at a central control station, whereas the remainder of the system can be at some remote or otherwise inconvenient place. Again, the power supply, namely battery 32, or an A.C. mains-energized rectifier type power pack can likewise be located for convenience, independent of location of the rest of the system, or of load resistance 10. Powering oscillator 2 and amplifier 4 from battery 32 or other load circuit power source simplifies maintenance and construction.

There is, of course, a given current flowing in load circuit 9 even when the voltage at terminals 16 is such as to call for a lesser current. This is not disadvantageous, for it is common practice to provide this feature, even when the particular circumstances giving rise to it here do not exist. For example, many current-operated instruments are designed to produce their useful output over a range of current inputs which do not change their sense, and the least of which is not zero. For example, a valve-operator may be designed to remain closed until the current input to the valve exceeds 4 milliamperes, or a meter would be designed to just begin to indicate away from some end of scale value of temperature, pressure or the like when a D.C. current representing that temperature, pressure, or the like just surpassed 4 milliamperes. In a typical case, the useful output of such instruments might be obtained over the range (4–20) ma. Accordingly, the present system is simply adjusted so that the total current flowing from terminal 38 to terminal 40, via diode 37, effective resistance 22, and effective resistance 24, is precisely 4 ma., when the voltage across terminals 15 calls for less than 4 ma. in load circuit 9. Consequently, the "zero" of the range of values of the condition responded to by condition responsive device 1, is that magnitude of the condition which will create a voltage across terminals 15 that calls for 4 ma. independently of regulator 33, or, say, would call for 4 ma. were oscillator 2 and amplifier 4 powered, temporarily, by a source independent of the load circuit 8. In other words, were the (4–20) ma. range to correspond to an instrument range of (100–500)° C., the voltage across terminal 15 would call for 4 ma. when the temperature attained 100° C., whereas below that temperature 4 ma. of current would always flow through resistance. It is to be noted, incidentally, that temperature (or other condition) and current could be inversely related (and not infrequently is, in practice). Thus 4 ma. would correspond to 500° C., to modify the previous example, and 4 ma. would flow as long as the temperature remained 500 ma. or higher, and would only be exceeded in the load circuit were the temperature to go below 500° C.

As it has been contemplated herein that the demodulator 8 is phase-sensitive, it is advantageous to adjust the combination of modulator 3, coupling 101 and condition responsive device 1 so that the voltage output of demodulator 8 at the center of the variable condition range (300°, in the temperature example used supra) is zero. Accordingly, the battery voltage and the diode 31 are so chosen that the negative bias on the emitter of 29 is sufficiently large that the demodulator output voltage, when its polarity is such as to drive the base of transistor in a negative direction with respect to the anode of diode 31, makes said base negative with respect to the emitter of transistor 29 only when the condition (e.g., temperature, reaches one extreme of its range, say 100°).

Figure 2:
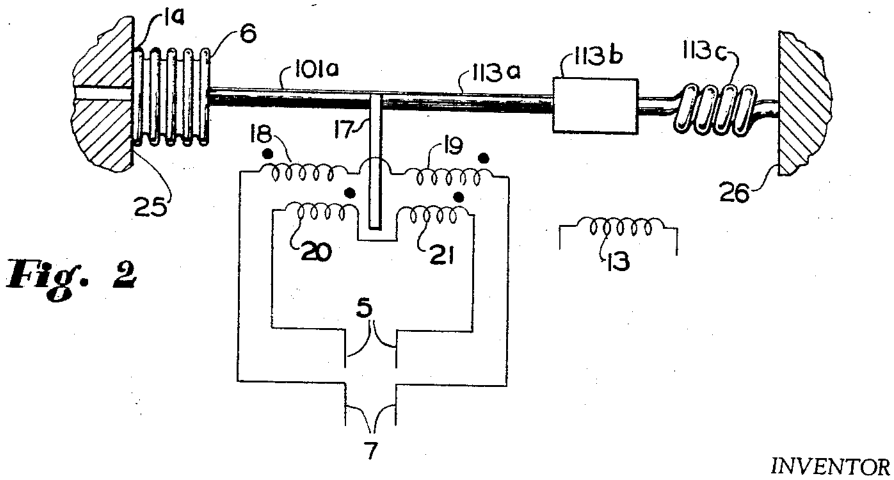
FIGURE 2 illustrates one possible form a portion of FIGURE 1 may take.

While, as has been remarked supra, the present invention is not particularly concerned with the contents of the labeled boxes in FIGURE 1, nevertheless I have illustrated in FIGURE 2 the rudiments of how a force-balance scheme might be realized in the system of FIGURE 1, just so much of the system of FIGURE 1 being reproduced in FIGURE 2 as will indicate the relation of the additional detail of FIGURE 2 to the system shown in FIGURE 1.

In FIGURE 2, condition responsive device 1 is portrayed as a bellows **1*a*, having a movable end 6 that moves to the right and the left, as the difference in the internal and external pressures acting on the bellows increases and decreases. Coupling 101 is portrayed as a rigid rod or stem 101*a*, and coupling 113 as a rigid stem 113*a*, a rigid ferromagetic core 113*b* and a spring 113*c*, the arrangement being that as bellows 1*a* expands, spring 113*c* yieldingly resists such expansion. As stems 113*a* and 101*a* move, a ferromagnetic armature 17 rigidly mounted thereon, is bodily translated along with the stems. The position of the armature is sensed by modulator structure including windings 18 through 21. Winding 18 is fixed in inductive relation to winding 20, and winding 19 is fixed in inductive relation to coupling 21. Windings 18 and 19 are connected in series with each other and are wound in the senses indicated by the dots at the ends thereof. Windings 20 and 21 are also connected in series with each other and are wound in a sense indicated by the dots at the ends thereof. As said dots indicate, windings 20 and 21 are in series-aiding connection, but windings 18 and 19 are in series-opposing connection. Therefore, if winding 20 is otherwise like winding 21, and winding 18 is otherwise like winding 19, then if the windings 20 and 21 are connected to output connection 5 of oscillator 2, as shown (and neglecting the effect of armature 17) then equal and opposite voltages will be induced in windings 18 and 19, and the voltage across connections 7 will be zero. Moreover, if in a given position of the armature 17, it provides flux linkage between windings 18 and 20 the same as it produces between windings 19 and 21, the net voltage across connections 7 remains zero. However, if armature 17 is moved to a position to the right or the left, one said flux linkage will decrease and the other will increase, and a corresponding disparity between the voltages induced in windings 18 and 19 will arise, whereby the net voltage across terminals 7 attains a value other than zero, which corresponds to the new armature position, and has a phase relationship, with respect to the oscillator output on connections 11, that corresponds to the sense of position change of armature 17. Taking the aforesaid given position of armature 17 as zero position, then the sense of change from that position is given by the polarity of the voltage on connections 15**, FIGURE 1.

In the system shown, the coil 13 will be arranged so that it exerts a magnetomotive force on armature **113*b*, due to the D.C. current through winding or coil 13, opposing the net force of bellows 1*a* and spring 113*c*, and the demodulator 8 and regulator 9 will be arranged so that a change in voltage across connections 7 due to a movement of armature 17 from the zero position, produces a change in said magnetomotive force such as returns armature 7 to the zero position thereof. In effect, therefore, change in the compressive force of bellows 1*a* on spring 113*c* is accompanied by an equal and opposite change in the contribution of coil 13 to the compressive force of bellows 1*a* on said spring. As changes in bellows force correspond quantitatively to changes in the difference between the internal and external pressures acting on the bellows, the intensity of the current through coil 13 is a measure of the said difference. As the current through coil 13 does not reverse, zero position of armature 17** will generally be made to create the center value of current, so that the sense of armature position change will be given by the sense of current change from said center value.

It is to be noted that the said compressive force arises by virtue of the fact that one end of the bellows and one end of spring **113*c* are fixed respectively to fixed structure, such as symbolized at 25 and 26, FIGURE 2, providing fixed points on some rigid structure such as a base, casing or the like (not shown), incorporating the structure shown in FIGURE 2, which structure also fixedly mounts coil 13**. It is also to be remarked that FIGURE 2 is more exemplary of principle than of the actual design of structural members ordinarily found in practice.

Again, as previously noted, the modulation-feedback scheme need not be force-balance. Thus, the combination of modulator 3, coupling 101 and condition responsive device 1 may be a transducer such as is shown in FIGURE 1 of the copending application of James T. Federici and Otto Muller-Girard, entitled, "Magnetic Flux Transducer and Transduction System," S.N. 406,068, filed October 23, 1964, and assigned to the assignee of the present invention. The transducer of Federici et al. consists essentially of, first, a magnet 2, a core 10, energizing-windings 21 and 22, and sensing-windings 27 and 28, corresponding to modulator 3 of the present case; and second, of stem 5 and bellows 1, corresponding respectively to coupling 101 and condition responsive device 1 of the present application. Accordingly, inductance or winding 13 of the present application corresponds to feedback windings 31 and 32 of Federici et al., and hence coupling 113 of the present case is simply the inductive relationship involved between said feedback windings 31 and 32 and the said core 10. In brief, Federici et al. furnish an example of where the feedback effect is realized by opposing magnetic flux, due to feedback current in a winding, to magnetic flux due to a magnet positioned in accordance with a variable condition, rather than by opposing a mechanical force to a mechanical force to achieve a force balance.

It is believed that the foregoing suffices to apprise one skilled in the art of the forms that may be taken by several elements of the box diagram part of the drawing in the present application. Similar exemplification could be made with respect to oscillator 2, amplifier 4, and demodulator 8, and indeed, FIGURE 4 of the aforesaid copending application of Federici et al. would serve such purpose, in the case of the last three named components of the present invention. However, the particular concern of the present invention is with what has been illustrated in FIGURE 1 of the present case as specific circuit structure, such as load circuit 9, and the power supply and bias circuitry, wherefore I do not believe it necessary to exemplify in detail the remainder of the system to any further extent.

The invention described herein may be modified in various ways, such as by utilizing PNP instead of the NPN transistors shown, for as is well known, such reversal of polarity as to transistor materials merely reverses circuit polarities in ways that are obvious to those skilled in the art.

Likewise, the demodulator 8 may be phase-insensitive. The phase-sensitive demodulator is advantageous where the output of modulator 3 involves a phase reversal when the input thereto goes past a given value creating zero output from the demodulator. However, it is possible to restrict, by various means, the input to demodulator 8 to modulated signals corresponding to modulator input on one side only of said given value, and in such case, a phase insensitive demodulator, such as a simple rectifier system not requiring a reference signal, could be used.

Again, various systems of current regulators different in circuit detail from what is shown herein as regulator 33 could be used. For instance, there are commercially available two-terminal modules which can be inserted between terminals 38 and 39 in place of the present regulator 33 (including diode 37), to do precisely the same thing as regulator 33.

Having described my invention in accordance with the requirements of the statutes, I claim:

1. A transduction system having a load circuit including a D.C. power source, a load resistance, and a transistor; said transistor having said load resistance and said source connected in series between its emitter and its collector, and being arranged so that current flows through said load resistance as a function of the voltage between said emitter and the base of said transistor; circuitry connected in parallel with said load resistance to receive current from one side of said source, and a diode connected to said circuitry and arranged to return the last said current to said source; said diode being so poled as to be forward biased with respect to the said last said current, the source side of said diode being connected to said emitter, and there being resistance connecting the other side of said diode to the base of said transistor, whereby the bias on said base differs from the bias on said emitter by the forward voltage drop of said diode; and means applying a signal voltage across the last said resistance, said transistor having material polarity such that for zero value of said signal voltage, the said forward voltage drop biases said transistor into conduction, whereby for a given signal voltage range including both positive and negative values, the current through said load resistor has a corresponding range of values but does not change its sense in response to change in sign of said signal voltage.

2. The invention of claim 1, wherein said circuitry includes transduction system means acting to ultimately produce said signal voltage; certain of said transduction system means including effective resistance through which the first said current flows to provide electrical activation needed by said transduction system means in order that said signal voltage be produced; and there being current regulating means arranged to have said first said current flow therethrough, said current regulating means being automatically operative to maintain said last said current at a constant value independently of the value of current flowing through said load resistor.

3. The invention of claim 1, wherein said circuitry includes transduction system means acting to ultimately produce said signal voltage, and certain of said transduction system means including circuit means having effective resistance through which the first said current flows to provide electrical activation needed by said transduction system in order that said signal voltage be produced, and there being current stabilizing means arranged to have said first said current flow therethrough and being automatically operative to maintain said first said current at constant value independently of the value of current flowing through said load resistor, said current stabilizing means including a transistor connected so that said first said current flows between its collector and its emitter, and bias means biasing the base of the last said transistor such as to maintain said first said current at said constant value.

4. The invention of claim 3, wherein said bias means is a zener diode connected so as to be reverse-biased by the voltage-drop of the current through said load resistance, the thus-biased side of said diode being connected to the collector of said last said transistor and the other side of said zener diode being connected to one side of said effective resistance; the said effective resistance having the other side thereof connected to the emitter of said last said transistor, whereby the said constant value of said last said current is essentially fixed by the value of said effective resistance and the breakdown voltage of said diode.

5. The invention of claim 1, wherein said transistor is made of material like that of said diode, whereby to compensate for temperature variation of the forward drop of the base-emitter junction of said transistor.

6. A transduction system including a device responsive to a condition and a load circuit having a load resistance and a D.C. power source therein, there also being transduction system means operative in response to said condition to cause a D.C. current to flow through said load resistance from said power source at a value that is a function of said condition; said transduction system having effective resistance through which a D.C. current must flow in order that said transduction system be thus operative, said effective resistance being effectively connected parallel to said load circuit; and a regulator constructed and arranged to cause a substantially fixed value of D.C. current to flow from said D.C. power source through said load resistance and through said effective resistance, and to flow thus independently of the value of the first said D.C. current.

7. A transduction system having a load circuit including a D.C. power source, a load resistance and a current regulator; said transduction system also having circuitry producing an electrical signal for controlling said regulator; said regulator being connected in series with said source and said load resistance and being responsive to said electrical signal to cause D.C. current to flow through said load resistance in correspondence with the amplitude of said electrical signal; said circuitry having transduction system means including effective resistance through which D.C. current must flow to provide electrical activation needed by said transduction system means in order that said electrical signal be produced; and a further current regulator, said further current regulator being connected between said load circuit and said effective resistance and providing a current path allowing flow of D.C. current between said load and said circuitry via said effective resistance, said further current regulator being constructed and arranged to substantially fix the last said D.C. current to a value independent of the value of the D.C. current flowing through said load resistance.

8. In combination, transduction system means, a first current regulator, a second current regulator, a load resistance, a D.C. power source, a fixed signal source and a variable signal source; said load resistance, said D.C. power source, and said first current regulator being connected in series with each other in a first closed circuit; said load resistance, said D.C. power source and said second current regulator being connected in series with each other in a second closed circuit; and said regulators being connected in parallel with each other such that each provides a current path, whereby to provide parallel current paths between which current flow through said load resistance divides; said first current regulator being responsive to a variable signal from said variable signal source to maintain current flow through its said current path having a value varying in accordance with variations in the said variable signal; said second regulator being responsive to a fixed signal from said fixed signal source to maintain a current flow through its said current path having a fixed value corresponding to the said fixed signal; said transduction system means including said variable signal source and also having effective resistance through which current must flow in order that said variable signal source produce said variable signal, and the said current path of said second current regulator including said effective resistance as a part thereof through which said current flow of fixed value occurs.

9. The invention of claim 8, wherein said fixed signal source is a D.C. voltage source, and said second regulator is responsive to the D.C. voltage of said D.C. voltage source to maintain a current flow, through its said path in correspondence to the value of said D.C. voltage; said D.C. voltage source being responsive to current flow through said load resistance to produce its said D.C. voltage at fixed value independent of variation in current flow through said load resistance.

10. The invention of claim 9, wherein said fixed signal source is a zener diode whose breakdown voltage corresponds to the required value of said current flow of fixed value and provides said D.C. voltage, said zener diode being connected in parallel with said current regulators so as to be broken down by the voltage drop across said regulators.

References Cited

UNITED STATES PATENTS

| | | | |
|---|---|---|---|
| 2,854,633 | 9/1958 | Jager | 324—118 |
| 2,964,693 | 12/1960 | Ehret | 323—4 |
| 3,051,932 | 8/1962 | Cressey et al. | 340—187 |
| 3,051,933 | 8/1962 | Cressey et al. | 340—187 |
| 3,253,210 | 5/1966 | Cummins. | |

ARTHUR GAUSS, *Primary Examiner.*

S. MILLER, *Assistant Examiner.*